United States Patent [19]

Normanton et al.

[11] 4,252,755
[45] Feb. 24, 1981

[54] CO-EXTRUSION METHOD AND APPARATUS

[76] Inventors: James K. Normanton, 13 Braehead, Alloa; James E. Robinson, 11 Station Rd., Kincardine, both of Scotland

[21] Appl. No.: 40,710

[22] Filed: May 21, 1979

[51] Int. Cl.³ .................. B29D 27/00; B29F 3/10
[52] U.S. Cl. .................... 264/45.9; 264/171; 264/174; 366/76; 425/133.1; 425/133.5; 425/208; 425/817 C
[58] Field of Search ............ 264/45.9, 211, 171, 264/174; 366/76; 425/133.1, 133.5, 208, 817 C

[56] References Cited

U.S. PATENT DOCUMENTS

| | | | |
|---|---|---|---|
| 3,148,412 | 9/1964 | Spreeuwers | 264/211 X |
| 3,314,108 | 4/1967 | Wienand et al. | 425/133.1 |
| 3,482,006 | 12/1969 | Carlson | 264/53 X |
| 3,827,841 | 8/1974 | Kawai et al. | 264/51 X |
| 3,866,890 | 2/1975 | Tadmor et al. | 366/76 |
| 3,871,629 | 3/1975 | Hishida | 366/76 |
| 3,903,233 | 9/1975 | Dougherty | 264/45.9 X |
| 3,914,357 | 10/1975 | Cereijo et al. | 264/45.9 X |
| 3,956,438 | 5/1976 | Schippers | 264/211 X |
| 3,999,921 | 12/1976 | Thor et al. | 425/208 |
| 4,054,403 | 10/1977 | Hornbeck et al. | 264/45.9 X |
| 4,094,946 | 6/1978 | Finkensiep et al. | 264/171 |
| 4,164,385 | 8/1979 | Finkensiep | 264/211 X |

Primary Examiner—Philip Anderson
Attorney, Agent, or Firm—Brooks, Haidt, Haffner & Delahunty

[57] ABSTRACT

An extruder for simultaneously extruding two plastics materials without intermixing thereof prior to exiting the extruder. The extruder barrel has two feed hoppers at one end and an outlet at the opposite end and contains a rotatable screw with two spaced screw threads of the same handedness which form two helical channels, each fed from one of the hoppers. One channel extends from a hopper to the outlet and the other channel is blocked in advance of the outlet so that substantially all the material therein is forced to enter a passage in the screw which extends to the outlet. Also, a process for extruding the two plastics materials and for coating a wire with two layers with a die having a single material receiving channel.

13 Claims, 4 Drawing Figures

CO-EXTRUSION METHOD AND APPARATUS

The present invention relates to screw extrusion apparatuses, and in particular, although not exclusively, to extrusion apparatuses for use in the extrusion coating of wires and cables, e.g. telephone "singles," coatings having a foamed inner core of plastics insulation material surrounded by a sheath or skin of unfoamed plastics insulation material.

It is known in the art to form wire and cable insulations having a foamed inner core and an unfoamed outer skin by utilizing two co-extruders—one supplying the core material and one supplying the skin material. The present invention seeks to avoid the use of co-extruders by utilizing a single, twin-channelled screw extruder for supplying both materials.

According to the present invention there is provided an extrusion apparatus comprising an extruder barrel, supply means mounted on said barrel for feeding material into the extrusion apparatus, an extruder screw within said barrel, the extruder screw having thereon a first and second screw thread of the same handedness, each of which threads slidably engages the interior wall of the extruder barrel, the first and second screw threads defining between them two helical screw channels, one of the screw channels extends completely to that end of the screw remote from the supply means and the other screw channel terminates before said end, the screw having a passage opening into said other, terminated, screw channel towards the terminated end thereby to allow material in said other, terminated, screw channel to be extruded and to leave the screw without substantial intermixing with material in the other channel, the supply means being so arranged that each channel can be fed separately with different material.

The present invention also provides a process for simultaneously extruding two plastics materials which comprises, (1) feeding the two plastics materials to a common extruder screw having thereon a first and second screw thread of the same handedness, the first and second screw threads defining between them two helical screw channels, each plastics material being fed to a separate channel, and each channel having a separate exit from the screw, (2) rotating the screw so as to extrude plastics material from the screw without substantial mixing of material in the thread with material in the other.

The separate exits are most conveniently provided by allowing one of the screw channels to continue to the end of the screw in the usual way while the other screw channel is terminated short of the exit end of the screw, i.e. the end from which material is extruded, a passage being provided in the terminated screw channel towards the terminated end to provide the second exit from the screw. The other end of the passage preferably opens in the centre of the exit end of the screw.

The two screw channels referred to above are defined as being formed between the first and second screw threads, it will be readily apparent that if a section is taken through the longitudinal axis the screw cross-section of the channels in the screw will be alternatively cross-sections of one and then the other screw channel, formed for example between a cross-section of the first thread, a cross-section of the second thread, and another cross-section of the first thread.

One embodiment of the extrusion apparatus of the present invention will now be described with reference to the accompanying drawings, in which.

Figure 4:
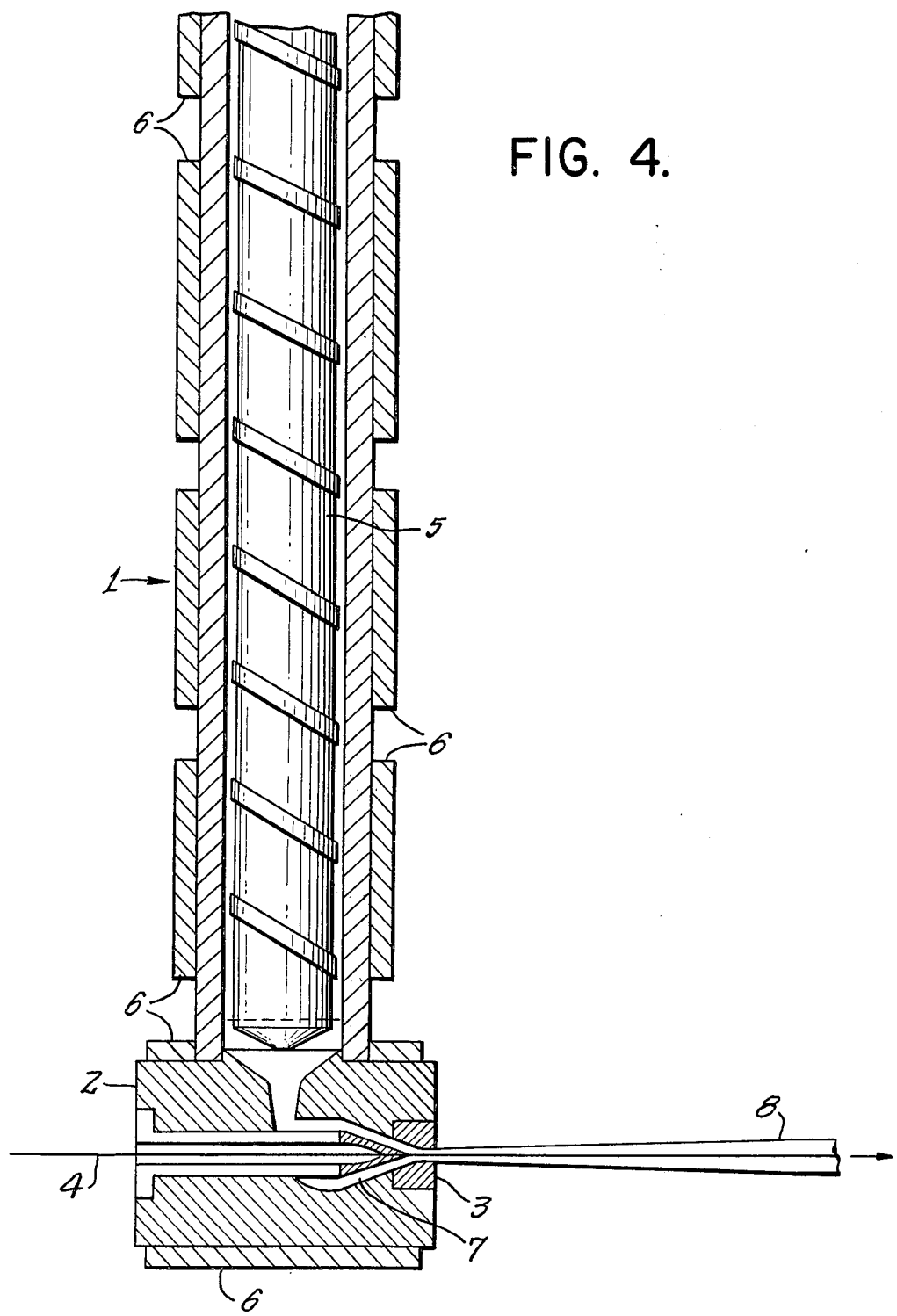
FIG. 4 is a view in section of a conventional screw extrusion apparatus and a conventional die head which is suitable for use in the production of telephone wire having a foamed insulation layer.

Referring firstly to FIG. 4, telephone wire having a foamed insulation layer is conventionally produced by extruding plastics material which contains a blowing agent through a heated screw extruder 1 into a die head 2 having a die 3 therein through which the wire 4 to be coated passes. The plastics material is supplied usually as a pelletized solid via a hopper (not shown) and, as the screw 5 of the extruder rotates, the material is forced through the barrel of the extruder and into the die head 2. Both the barrel of the extruder and the die head are heated by means of a plurality of heaters 6 so that the plastics material is in a molten condition and the blowing agent is activated on reaching the die. The wire to be coated passes through the centre of a guider tip 7 held within the die head 2 which is shaped so as to ensure that the molten plastics material flows smoothly around the wire and coats the wire uniformly. As the coated wire leaves the die 3, the activated blowing agent foams the plastics coating and an expansion cone 8 is observed around the wire leaving the die. The foamed plastics layer then cools and solidifies around the wire to yield the finished cable.

Figure 2:
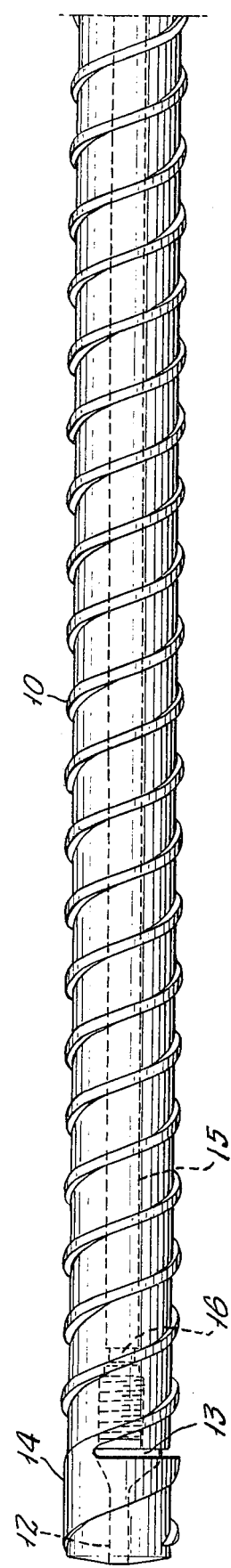
FIGS. 2 and 3 show in elevation the complete twin-channelled screw of the apparatus in FIG. 1.
Figure 3:
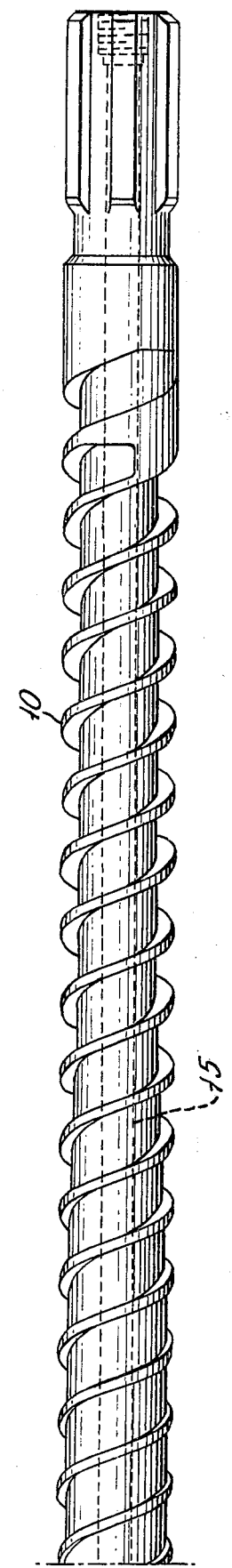

FIGS. 2 and 3 of the accompanying drawings show a twin-channelled screw 10 which when used in place of the screw of a conventional extruder will allow the formation of telephone wire having a foamed inner layer of plastics insulation material and an outer layer of unfoamed plastics material. The screw comprises two helical channels defined by two screw threads. The widths and the depths of two adjacent portions of the two channels may be of the same or may be different in accordance with the desired ratio of foam thickness to skin thickness in the final extrudate. The physical properties of the extrudate, for example, its specific gravity, will be dependent on this ratio. The material contained in each portion of one channel does not mix to any substantial extent with the material contained in the adjacent portions of the other channel. In a preferred embodiment of the present invention the rate of feeding material is controlled so that the desired foam thickness/skin thickness ratio is achieved.

Figure 1:
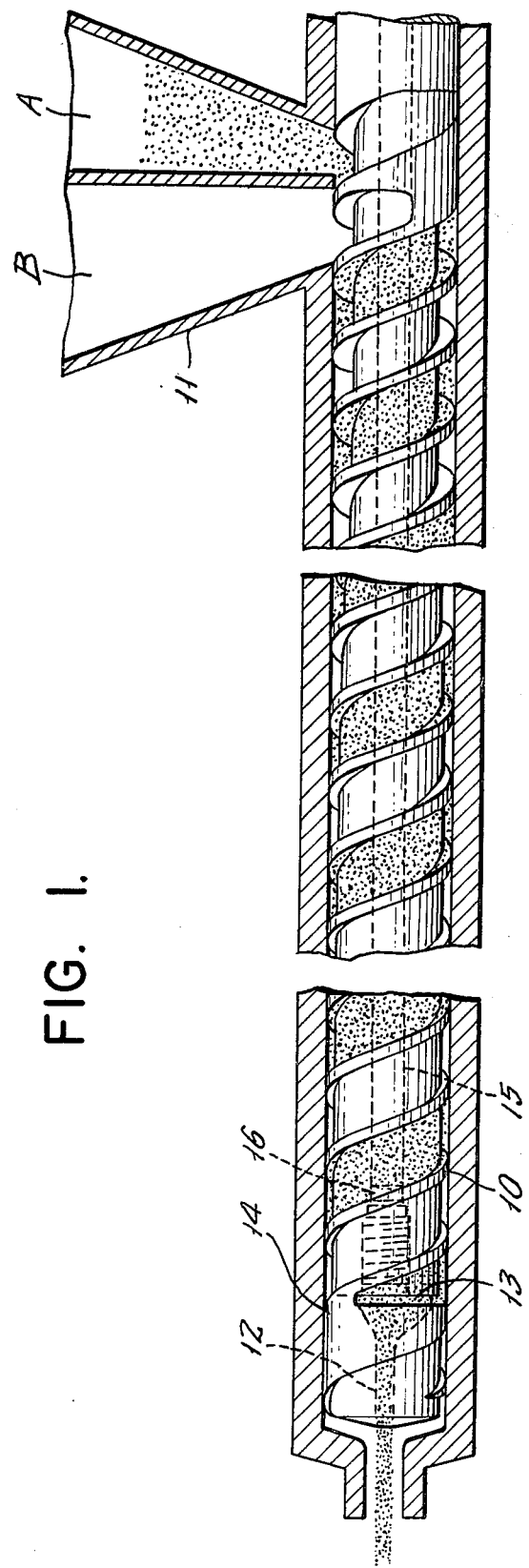
FIG. 1 is a view in section of the extrusion apparatus of the invention.

The two materials are supplied to the twin-channelled screw via a split hopper 11 having portions A and B as shown in FIG. 1, and are each extruded without intermixing in the conventional manner.

In the preferred practice of the invention that portion of the split hopper 11 remote from the nose of the extruder screw is "starve fed" by means of a constant rate feeder (not shown) to approximately two thirds of its potential capacity. The screw channel supplied by that portion of the hopper is therefore not completely filled, but on passing under the other, fully loaded, portion of the split hopper 11 this channel together with the other channel are filled to capacity by material in that portion of the hopper. The desired ratio of foam thickness to skin thickness can thus be obtained by varying the feed rate of the hopper feeder. During the extrusion process itself an over thread or overflight material leakage of approximately 5% is generally found, but this is insignificant in terms of the structure and physical properties of the final extruded material.

Whilst the design of the threads of the extruder screw is conventional, the nose of the twin-channelled screw is, however, adapted to allow the extruded material which will constitute the inner foamed insulation layer to emerge from the centre of the nose of the screw surrounded by the extruded material which will constitute the outer unfoamed layer. This is achieved by providing a central bore 12 in the end of the screw which communicates with a passageway 13 at the end of one of the screw channels. Material being extruded along this channel is prevented from leaving the screw around its circumference by the portion of the second thread marked 14 and is instead led through the central bore of the screw. Thus the extrudate consists of a central core of one material surrounded by an annulus of a second material.

By careful shaping of the die head, laminar flow of this two component extrudate is achieved around the guider tip and into the die. Thus the wire to be coated is provided with a uniform inner layer of one plastics material and an outer layer of a second plastics material.

In order to provide a foamed inner layer and an unfoamed outer layer, the blowing agent is only added to the material in that portion of the split hopper "A" which supplies the appropriate channel. For telephone "singles" or coaxial relay cable insulation, the plastics material used to form both layers is usually the same polymer, e.g. polyethylene. High, medium or low density polyethylene may be used, but it is preferred that the inner layer be formed from medium density polyethylene whilst the skin is formed from high density polyethylene. Other polymers, e.g. polypropylene, could also be used.

Satisfactory foaming of the inner layer has been achieved using blowing agents which are susceptible to thermal activation, e.g. azo-dicarbonamide at about 210° C. and p,p-oxy-bis(benzene sulphonyl hydrazide) at from 150° to 155° C. These activation temperatures have to be reached by the material as it enters the die.

In accordance with conventional practice, the extruder screw is generally provided with an internal bore 15 through which a coolant, usually water, may be passed during the extrusion process. This bore is plugged at 16.

The extrusion apparatus of the present invention has been described with particular reference to its use in producing coatings for telephone cables. It will be understood, however, that the present apparatus can, with suitable die configurations, be used to form rods, filaments, tubes, sheets or films, or discrete articles such as bottle closures where a layered structure is required. Thus, for example, a laminate having a central insulation portion and an outer flame resistant coating can be formed. The described extrusion apparatus may also be used in conventional blow moulding and injection moulding processes.

The following Examples illustrate the present invention as used to form a foam/skin cylindrical laminate. In each of the Examples, a conventional 2¼" diameter extruder body was used, but the extruder screw was as illustrated in FIGS. 2 and 3 of the accompanying drawings. The extruder had a length to diameter ratio of 21:1 and was connected to a specially designed split hopper. The portion "A" of the hopper feeding material to the core of the extrudate was "starve fed" by a conventional small vibratory feeder and the crosshead of the extruder was of conventional design. The dies used in the Examples were commercially available, general purpose, wire coating dies, although in the runs wire for coating was not passed through the dies. The extrudates were therefore in the form of rods.

EXAMPLE 1

Portion B of the split hopper was charged with a BXL low density polyethylene having a melt flow index of 2.0 dg/min and a nominal density of 0.917 g/cc. The vibrator-feed portion A of the hopper was charged with a BXL expandable polyethylene compound comprising 98.7% by weight of a low density polyethylene having a melt flow index of 2.0 dg/min and a nominal density of 0.917 g/cc, 1.2% by weight of p,p-oxy-bis(benzene sulphonyl hydrazide) and a nominal 0.1% by weight of an antioxidant to give processing stability.

3% by weight of a yellow masterbatch was added to the vibrator-feed compound as a trace colurant.

The vibratory feeder was adjusted to feed portion A of the hopper at a constant rate of 3.7 kg/hr. The extruder screw speed was maintained constant at 25 rpm giving an overall output of 11.5 kg/hr. Extruder barrel temperatures were adjusted to give a melt temperature of 155° C.

A 3 mm diameter die was fitted to the crosshead resulting in an extrudate diameter of approximately 5.2 mm. The extrudate had a specific gravity of 0.8 and, when sectioned, a clearly defined foam/skin structure was observed.

EXAMPLE 2

Portion B of the split hopper was charged with a Union Carbide high density polyethylene having a melt flow index of 0.3 dg/min and a nominal density of 0.950 g/cc. The vibrator-feed portion A of the hopper was charged with a BXL expandable polyethylene compound comprising 98.9% by weight of a medium density polyethylene having a melt flow index of 0.7 dg/min and a nominal density of 0.933 g/cc, 1% by weight of azo-dicarbonamide and a nominal 0.1% by weight of an antioxidant to give processing stability.

1% by weight of a brown masterbatch was added to the vibrator-feed compound as a trace colourant.

The vibratory feeder was adjusted to feed portion A of the hopper at a constant rate of 2.5 kg/hr. The extruder screw speed was maintained constant at 45 rpm giving an overall output of 13.0 kg/hr. Extruder barrel temperatures were adjusted to give a melt temperature of 230° C.

A 3 mm diameter die was fitted to the crosshead resulting in an extrudate diameter of approximately 6.4 mm. The extrudate had a specific gravity of 0.8 and, when sectioned, a clearly defined foam/skin structure was observed.

EXAMPLE 3

Portion B of the split hopper was charged with a BXL medium density polyethylene having a melt flow index of 0.7 dg/min and a nominal density of 0.933 g/cc. The vibrator-feed portion A of the hopper was charged with a BXL expandable compound comprising 98.9% by weight of a medium density polyethylene having a melt flow index of 0.7 dg/min and a nominal density of 0.933 g/cc, 1% by weight of azo-dicarbonamide and a nominal 0.1% by weight of an antioxidant to give processing stability.

1% by weight of a brown masterbatch was added to the vibrator-feed compound as a trace colourant.

The vibratory feeder was adjusted to feed portion A of the hopper at a constant rate of 2.3 kg/hr. The extruder screw speed was maintained constant at 25 rpm giving an overall output of 8.9 kg/hr. Extruder barrel temperatures were adjusted to give a melt temperature of 215° C.

A 1 mm diameter die was fitted to the crosshead resulting in an extrudate diameter of approximately 2.4 mm. The extrudate had a specific gravity of 0.7 and, when sectioned, a clearly defined foam/skin structure was observed.

EXAMPLE 4

Portion B of the split hopper was charged with a BXL medium density polyethylene having a melt flow index of 0.7 dg/min and a nominal density of 0.933 g/cc. The vibrator-feed portion of the hopper was charged with a BXL expandable compound comprising 97.9% by weight of a medium density polyethylene having a melt flow index of 0.7 dg/min and a nominal density of 0.933 g/cc, 2% by weight of azo-dicarbonamide and a nominal 0.1% by weight of an antioxidant to give processing stability.

3% by weight of a brown masterbatch was added to the compound in portion B of the hopper as a trace colourant.

The vibratory feeder was adjusted to feed portion A of the hopper at a constant rate of 2.3 kg/hr. The extruder screw speed was maintained constant at 25 rpm giving an overall output of 9.3 kg/hr. Extruder barrel temperatures were adjusted to give a melt temperature of 217° C.

A 3 mm diameter die was fitted to the crosshead resulting in an extrudate diameter of approximately 6.6 mm. The extrudate had a specific gravity of 0.65 and, when sectioned, a clearly defined foam/skin structure was observed.

What we claim is:

1. A process for simultaneously extruding two plastics materials from the outlet of an extruder without substantial mixing of the materials prior to reaching said outlet, said extruder having a barrel with a rotatable extruder screw therein which extends from said outlet to a point remote therefrom and which has first and second screw threads of the same handedness, the threads defining between them first and second helical channels and the threads engaging the inner wall of the barrel, said process comprising:
   while rotating said screw, feeding one of said channels at a feed point remote from said outlet and feeding the other of said materials to the other of said channels at a feed point remote from said outlet thereby to advance the materials from the feed points toward said outlet;
   diverting substantially all of said one of said materials from said one channel, before it reaches said outlet, into a passage in said screw which extends to said outlet by blocking said one channel in advance of said oulet and blocking the space between the barrel and a portion of the screw intermediate the point of blocking of the one channel and the outlet; and
   permitting the other material to pass to the outlet from the other channel along the exterior of said screw.

2. A process as claimed in claim 1 further comprising feeding one of said plastics material to a channel at a rate less than the rate required to fill said last-mentioned channel.

3. A process as claimed in claim 1 wherein the feed point for said one channel is farther from said outlet than the feed point for said other channel and wherein said one channel passes by said feed point for such other channel, said process comprising feeding said one of the plastics material to said one channel at a rate less than the rate required to fill said one channel.

4. A process as claimed in claim 1 further comprising feeding the materials at the outlet of said barrel to a single channel in a die for forming said materials.

5. A process as claimed in claim 4 wherein said die is a die for forming filament, tube, sheet or film and forms a multi-layered structure.

6. A process as claimed in claim 1, 2 or 4 wherein one of said plastics materials is an expandable material.

7. A process as claimed in claim 1, 2 or 4 wherein at least one of the materials comprises polyethylene or polypropylene.

8. A process as claimed in claim 4, wherein said die has a conductive wire guiding tip which is surrounded by said channel and which has a passage therethrough and further comprising feeding a wire through said last-mentioned passage as said materials are fed to said channel to form simultaneously two layers around said wire.

9. A process as claimed in claim 8 wherein said last-mentioned passage extends transversely to the axis of the screw threads and is a cross-head die, the movement of the materials in said die being in a direction transverse to the direction of movement of the materials in said barrel.

10. An extrusion apparatus comprising an extruder barrel defining a cylindrical chamber with an inner wall, said barrel having an inlet end and an outlet at its other end, an extruder screw within said barrel for conveying extrudable materials from said inlet end to said outlet in separate streams, said extruder screw having first and second screw threads of the same handedness, said extruder screw being rotatable around the axis of the screw threads and each of said threads slidably engaging said inner wall of said barrel, the first and second screw threads defining between them two helical screw channels, one of which extends from said inlet end and to said outlet and the other of which extends from said inlet end to adjacent said outlet, said screw having a passage therein extending to said outlet from said other channel and opening into said other channel at a point thereon spaced from said outlet in the direction of said inlet end and said screw having terminating means thereon intermediate said point and said outlet which blocks said other channel so as to substantially prevent material in said other channel from reaching said outlet between said inner wall and the periphery of the portion of said screw intermediate said terminating means and said outlet and so as to cause said last-mentioned material to flow through said passage to said outlet, and first and second extrudable material supply means connected to said barrel at said inlet end for respectively supplying extrudable materials to said one channel and to said other channel whereby a first material may be fed to one said channel and a second different material may be fed to the other said channel and delivered to said outlet without substantial intermixing of the first and second materials prior to reaching said outlet.

11. An extrusion apparatus according to claim 10 further comprising a die having a central passage extending transversely to said axis of the screw threads for the passage of a conductive wire therethrough and having an extruded material passage separate from and extending around said central passage, said extruded material passage joining said central passage at the outlet of said die for coating said wire at the die-outlet, and means connecting the outlet of said barrel to said extruded material passage for the flow of the extruded materials from said barrel outlet into said extruded material passage, whereby said wire may be coated with materials received from said channels, the material from one of said channels forming an inner layer and the material from the other of said channels forming an outer layer on said inner layer.

12. An extrusion apparatus as claimed in claim 10 in which the passage opening into the terminated screw channel opens at its other end at the centre of the end of the screw.

13. An extrusion apparatus according to claims 10 or 2 wherein the supply means comprises a split hopper.

* * * * *